(12) United States Patent
Matheson

(10) Patent No.: US 11,818,305 B2
(45) Date of Patent: *Nov. 14, 2023

(54) DISTRIBUTED SENSING AND VIDEO CAPTURE SYSTEM AND APPARATUS

(71) Applicant: Verint Americas Inc., Alpharetta, GA (US)

(72) Inventor: Roderick Matheson, Columbia, MD (US)

(73) Assignee: VERINT AMERICAS INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,309

(22) Filed: Mar. 14, 2022

(65) Prior Publication Data

US 2022/0201133 A1  Jun. 23, 2022

Related U.S. Application Data

(63) Continuation of application No. 16/848,329, filed on Apr. 14, 2020, now Pat. No. 11,277,526, which is a continuation of application No. 16/024,248, filed on Jun. 29, 2018, now Pat. No. 10,652,407, which is a continuation of application No. 15/701,024, filed on Sep. 11, 2017, now Pat. No. 10,038,798, which is a continuation of application No. 15/473,244, filed on
(Continued)

(51) Int. Cl.
*H04N 1/00* (2006.01)
*H04N 23/661* (2023.01)
*H04N 7/18* (2006.01)
*G06F 3/14* (2006.01)
*H04L 41/06* (2022.01)
*H04L 41/22* (2022.01)

(52) U.S. Cl.
CPC .......... *H04N 1/00209* (2013.01); *G06F 3/14* (2013.01); *H04L 41/06* (2013.01); *H04L 41/22* (2013.01); *H04N 7/18* (2013.01); *H04N 7/181* (2013.01); *H04N 23/661* (2023.01)

(58) Field of Classification Search
CPC ...... H04N 1/00209; H04N 5/232; H04N 7/18; H04N 7/181; H04N 23/661; G06F 3/14; H04L 41/06; H04L 41/22
See application file for complete search history.

(56) References Cited

U.S. PATENT DOCUMENTS 5,959,529 A    9/1999   Kail
6,829,430 B1 * 12/2004  Ashizaki ................ H04N 5/772
                                                      386/242
(Continued)

*Primary Examiner* — Nicholas G Giles
(74) *Attorney, Agent, or Firm* — Christopher M. Scherer; Erin Ella Block; DeWitt LLP

(57) ABSTRACT

Systems and apparatus for sensing and video capture include at least one camera with an optical sensor that captures video image data of a first sampling rate. An auxiliary sensor captures auxiliary data at a second sample rate. A processor is communicatively connected to the optical sensor and auxiliary sensor. The processor transmits video image data captured at the first sample rate auxiliary sensor data captured at the second sampling rate across a data connection to a centralized computer that receives the video image data and the auxiliary sensor data and operate to present the video image data and the auxiliary sensor data on a graphical display.

20 Claims, 3 Drawing Sheets

Related U.S. Application Data

Mar. 29, 2017, now Pat. No. 9,794,428, which is a continuation of application No. 14/280,005, filed on May 16, 2014, now Pat. No. 9,648,283.

(60) Provisional application No. 61/823,948, filed on May 16, 2013.

(56) References Cited

U.S. PATENT DOCUMENTS

| | | |
|---|---|---|
| 7,460,149 B1 | 12/2008 | Donovan |
| 7,688,306 B2 | 3/2010 | Wehrenberg |
| 8,026,945 B2 | 9/2011 | Garoutte |
| 9,648,283 B2 | 10/2017 | Matheson |
| 9,794,428 B2 | 10/2017 | Matheson |
| 10,038,798 B2 | 7/2018 | Matheson |
| 10,652,407 B2 * | 5/2020 | Matheson ............ H04N 23/661 |
| 11,277,526 B2 * | 3/2022 | Matheson ............... H04L 41/22 |
| 2009/0154910 A1 | 6/2009 | Weinberg |
| 2009/0184849 A1 | 7/2009 | Nasiri |
| 2014/0211031 A1 | 7/2014 | Han |

\* cited by examiner

DISTRIBUTED SENSING AND VIDEO CAPTURE SYSTEM AND APPARATUS

CROSS-REFERENCE TO RELATED APPLICATION

The present application is a continuation of U.S. application Ser. No. 16/848,329, filed Apr. 14, 2020, which application is a continuation of U.S. application Ser. No. 16/024,248, filed Jun. 29, 2018, which application is a continuation of U.S. application Ser. No. 15/701,024, filed Sep. 11, 2017, which application is a continuation of U.S. application Ser. No. 15/473,244, filed Mar. 29, 2017, which application is a continuation of U.S. application Ser. No. 14/280,005, filed May 16, 2014, which application claims priority of U.S. Provisional Patent Application No. 61/823,948, filed on May 16, 2013, the contents of which are hereby incorporated herein by reference in their entireties.

BACKGROUND

Currently closed circuit television (CCTV) systems include a plurality of video cameras connected by cabling to a central point at a facility or to a remote location where the video is recorded and/or displayed. CCTV systems are used for surveillance, security, and the collection of enterprise data. The installation costs for the data and power cabling for each of the video cameras in the system can approach or exceed the cost of the cameras themselves. Therefore, CCTV systems represent a significant investment for a facility.

BRIEF DISCLOSURE

An exemplary embodiment of a system for sensing and video capture includes at least one camera. The at least one camera includes an optical sensor, at least on auxiliary sensor, and a processor. A data connection is connected to the processor for transmission of data from the processor. A centralized computer receives the data from the processor across the data connection. The processor acquires and transmits video image data from the optical sensor at a first sample rate. The processor periodically acquires and transmits auxiliary sensor data from the auxiliary sensor. The centralized computer receives the video image data and the auxiliary sensor data across the data connection.

An exemplary embodiment of a digital video camera includes an optical sensor that captures video image data at a first sampling rate. The digital video camera includes an auxiliary sensor that captures auxiliary sensor data at a second sampling rate. A processor is communicatively connected to the optical sensor and to the auxiliary sensor. The processor transmits the video image data captured at the first sampling rate and the auxiliary sensor data captured at the second sampling rate.

An additionally exemplary embodiment of a system for sensing and video capture includes a plurality of cameras. Each camera includes an optical sensor, at least one auxiliary sensor, a processor, and a power supply. The optical sensor acquires video image data. The at least one auxiliary sensor acquires auxiliary data. The processor receives and processes the video image data from the optical sensor and the acquired auxiliary data from the at least one auxiliary sensor. The power supply provides power to the optical sensor, at least one auxiliary sensor, and a processor. At least one data connection is connected to each of the plurality of cameras. In each of the plurality of cameras, the data connection is connected to the processor and to the power supply. A centralized computer receives the digitized data from the processor across the data connection. The power supply in each camera of the plurality of cameras converts power from the data connection to provide power to the processor, optical sensor and at least one auxiliary sensor. The processor transmits the video data at a first sample rate and periodically acquires and transmits the auxiliary data at a second sampling rate across the data connection to the centralized computer. The first sampling rate is greater than the second sampling rate.

DETAILED DISCLOSURE

The introduction of internet protocol (IP) cameras has somewhat simplified the installation of CCTV systems as the output of the IP camera is digital and can travel over the same cabling used to power the camera using a technique called Power over Ethernet (POE). The IP camera includes a processor that is programmed to capture and perform basic video processing before the image data is packaged and sent to a centralized computer. The centralized computer may be on-site or remotely located.

In embodiments as disclosed in further detail herein, the disclosed IP camera includes one or more auxiliary sensors, exemplarily for sensing temperature, humidity, and/or acceleration. The processor processes the information obtained from these sensors at a lower sampling rate than the video signals and periodically multiplexes packages with the data from these auxiliary sensors to the centralized computer where the resulting data can be presented, processed, and/or stored.

Figure 1:
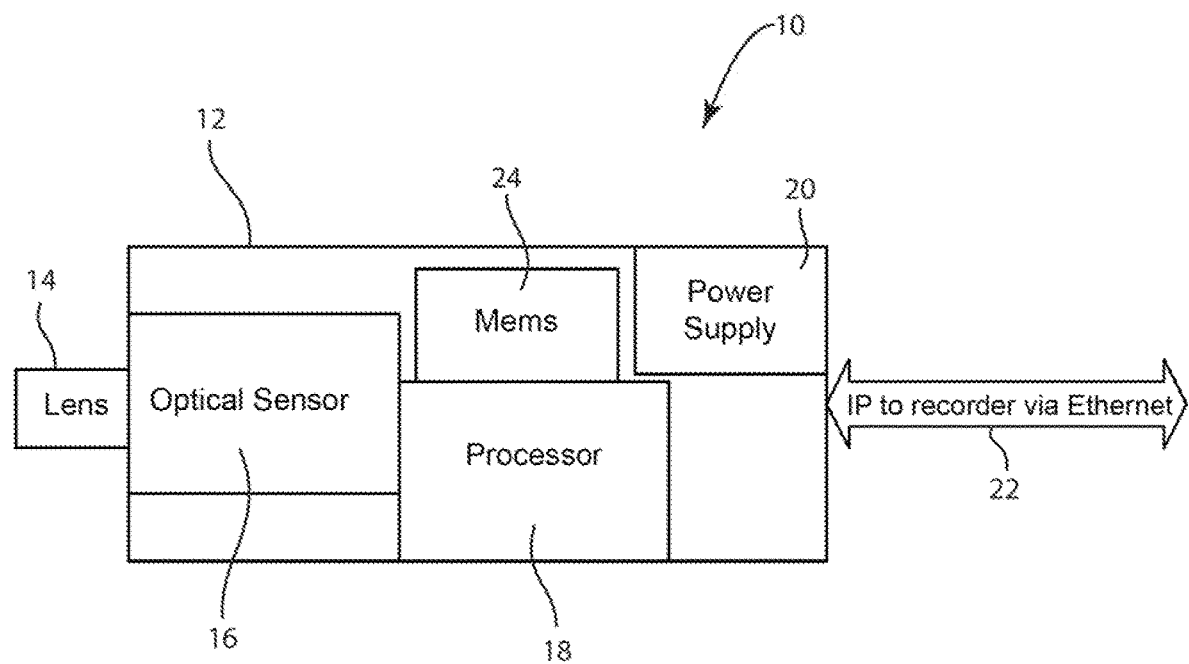
FIG. 1 is a schematic representation of an exemplary embodiment of a camera as disclosed herein.

FIG. 1 depicts an exemplary embodiment of an IP camera 10 as may be used in the embodiment of the system as disclosed herein. The camera 10 includes a housing 12 that contains and protects the electronic components found therein. Video capture functions of the camera 10 are fulfilled by a lens 14 and an optical sensor 16. The optical sensor 16 provides the captured image data to a processor 18 which either includes or is connected to a computer readable medium (not depicted) for storing computer readable code that upon execution by the processor causes the processor to execute the functions and operations as disclosed in further detail herein, including the operation of the optical sensor 16 to acquire images at a specified sampling rate.

The camera 10 further includes a power supply 20 which as previously disclosed may operate to provide power to the camera 10 through POE. It will be recognized that in alternative embodiments, the power supply may be other forms of power supplies including, but not limited to utility electrical power, battery power, solar power cells, or a converter of wirelessly transmitted power. However, it is recognized that in some security settings, CCTV systems need be operated with a dedicated hardwired communication and/or power. Therefore, in such embodiments, POE offers a solution to provide communication and power to the cameras 10 of a CCTV system. In an embodiment, the processor 18 and power supply 20 are connected to an Ethernet cable 22 which is connected to the centralized computer. In still further embodiments, particularly those that do not operate on POE, the processor 18 may be communicatively connected to the centralized computer in other manners, including wireless networks.

The IP camera 10 further includes one or more auxiliary sensors 24, which in a exemplary embodiment are microelectromechanical sensors (MEMS) 24 which will be described in further detail herein. Non-limiting examples of such MEMS that may be used in embodiments disclosed herein include light sensors, magnetic field sensors, pressure sensors, chemical sensors, accelerometers, temperature sensors, and humidity sensors; however, this is not intended to be limiting on the types of MEMS that may be incorporated into the camera 10 in accordance with the present disclosure. However, it will be recognized that other types of sensors besides MEMS may be used, including sensors for light, magnetic field, pressure, chemical, acceleration, temperature and humidity sensing.

Auxiliary sensors 24 are connected to the processor 18 and provide additional sensing and capability to the camera 10. In embodiments as disclosed herein, the auxiliary sensors 24 operate at a lower sample rate than the optical sensor 16. Although in alternative embodiments, the auxiliary sensors 24 may sense the physical characteristic at a higher sample rate although the processor 18 only samples or receives such samples from the auxiliary sensors 24 at a lower sample rate. In a non-limiting example, the optical sensor 16 may be multiplexed with the one or more auxiliary sensors 24 such that the processor 18 obtains samples far more frequently from the optical sensors 16, than any of the auxiliary sensors 24. In an embodiment, the purpose of this is to maintain the quality of the video capture and desired refresh rate of the video capture system, while providing additional sensing capabilities in the background of the video capture process.

The processor 18 operates to process the signals obtained from the auxiliary sensor 24 to create auxiliary data. The processor 18 then packages the required auxiliary data in a suitable format for transmission on the Ethernet cable 22 in between packages of video data.

Further features of the disclosed system will be highlighted below with respect to the incorporation and use of various auxiliary sensors, including MEMS, in exemplary embodiments.

Figure 2:
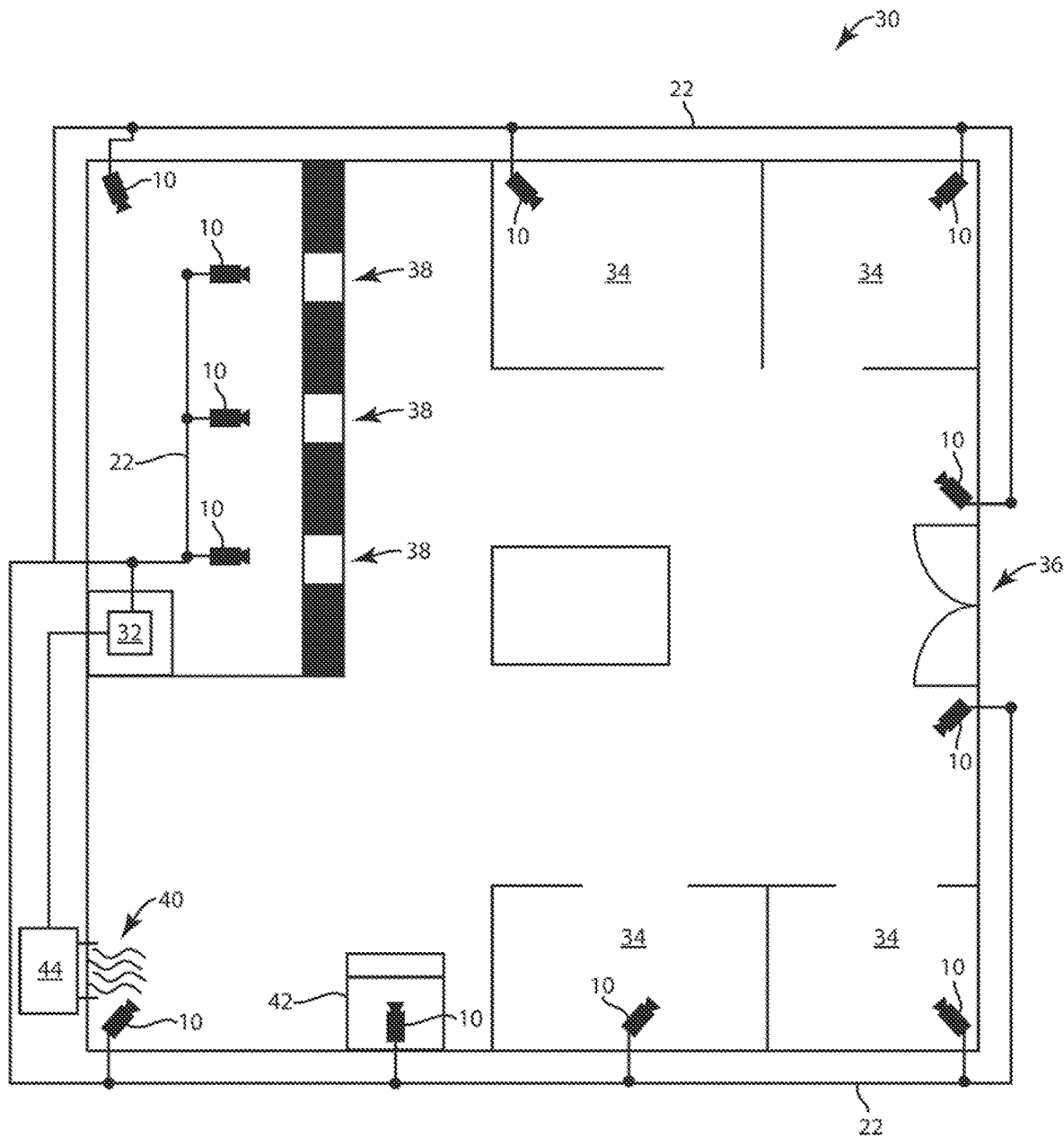
FIG. 2 is an exemplary embodiment of a system for sensing and video capture.

FIG. 2 depicts an exemplary floor plan layout of a CCTV system 30. The CCTV system 30 includes a plurality of cameras 10, which are exemplarily IP cameras 10 as described above. The plurality of cameras 10 are connected to a centralized computer 32 by one or more Ethernet cables 22.

FIG. 2 exemplarily depicts a basic layout of a bank, although such layout is merely for contextual purposes and is not intended to be limiting in any way on the function, layout, or facilities within which such a CCTV system may be established. In the layout depicted in FIG. 2, features include a plurality of offices 34, exterior doors 36, a plurality of teller stations 38, a vent 40 of an environmental control system, exemplarily an HVAC system, and an automated teller machine (ATM) 42. As can be seen in FIG. 2, the cameras 10 are distributed throughout the CCTV system such as to achieve a desired video capture coverage of the area. This is achieved by a wide distribution of cameras 10 throughout the facility, but also the IP cameras are positioned at specific sensitive areas such as the teller stations 38 or the ATM 42.

In a non-limiting embodiment wherein the auxiliary sensor is a temperature sensor, this distributed network of temperature sensors can further provide temperature information across the facility. This can constructively be used as a more distributed thermostat which, if integrated with environmental controls at the centralized computer 32, can enable more efficient operation of the environmental control system. In embodiments, the centralized computer 32 can automatedly send control signals to environmental control apparatus 22 (e.g. heater, air conditioner, humidifier) in response to the received auxiliary data (e.g. temperature). For example, customer or employee complaints of temperatures either being too hot or too cold can be empirically verified and operation of the environmental control system adjusted to address the problem. An example of an camera 10 with temperature sensor at or near an HVAC vent 40, can confirm HVAC operation to determine the temperature of the air blown into the facility is of a desired temperature for heating or cooling purposes.

The temperature at various locations in the facility does not change very rapidly, and therefore is not required to be sampled exemplarily multiple times per second, but rather can be sampled with less frequency exemplarily every 10 seconds, 30 seconds, once a minute, or even less frequently, although these sampling intervals are merely exemplary and are not intended to be limiting on the scope of the disclosure. This information on the temperature gradient within the facility can be used not only for specific environmental controls, but also can provide environmental information to facilitate improvements or remodeling to improve energy efficiency. For example, it may be identified that locations near the doors 36, or along a particular wall are colder or hotter than the rest of the facility and may be so at specific times of day. Therefore these areas may be identified for structural or energy efficiency improvement.

In still further embodiments, the incorporation of auxiliary sensor 24 that include a magnetic field sensor or a chemical sensor can provide additional safety and/or security capability to monitoring functions performed by the centralized computer 32. In an embodiment wherein the auxiliary sensor is a magnetic field sensor, auxiliary data indicative of sensed magnetic fields can be used by the centralized computer to identify intention or incidental sources of magnetic interference. This identification can improve security measures by identifying potential threats. Still further embodiments facilitate remodeling or layout of equipment or systems such as computers, televisions, power sources, or communication infra-structure so as to limit or minimize magnetic interference. Embodiments that incorporate chemical sensors can acquire and provide auxiliary data to the centralized computer 32 indicative of carbon monoxide presence or concentration. This can add safety features such as carbon monoxide detection into the existing system. In a further embodiment, detecting of chemical concentrations, exemplarily near an HVAC vent may provide an additional indication of the operation or maintenance needs of the HVAC system, for example if exhaust, particulates, or pollution is detected in the air entering the room.

In still further embodiments, the auxiliary sensors may be a humidity sensor and similar to the operation and use of embodiments with temperature sensors described above, the relative humidity within a facility may be measured or monitored and appropriate adjustments and controls provided to the environmental control system 44 may be made to reach a desired humidity level within a facility. Alternatively, such a mapping of the humidity within a facility may further direct maintenance or remodeling improvements that could be made to better control or achieve a desired humidity.

In an alternative embodiment, the auxiliary sensor may be an accelerometer that provides exemplarily three axis information on the angular attitude of the IP camera 10. Similar to that described above with respect to the temperature sensor, the angular attitude of the IP camera need not be sampled frequently and therefore can be easily incorporated into the data stream which is primarily video data from each of the IP cameras to the centralized computer 32 along the Ethernet connection 22. Non-limiting examples of advantages that can be achieved through the incorporation of the accelerometer can include assistance in installation, whereby once powered on, the IP camera 10 may provide auxiliary data indicative of the angular attitude of the camera such that an installer or technician can confirm proper placement of the cameras. Similarly, during operation, relatively infrequent sampling of the angular attitude of the cameras can confirm that each of the cameras are providing the desired field of view.

In a more specific embodiment, a camera 10 is either incorporated into or associated with a device such as an ATM 42. In order for the camera 10 to effectively capture the face of a user of the ATM, the camera 10 may require a very specific angle. It would be undesirable for a person of malintent to damage or reposition the camera, such that the camera is not pointed in the correct monitoring direction and thus does not fulfill its intended purpose. The detection of such a misalignment of the angular attitude of the IP camera can then be readily identified based upon the periodic output of the accelerometer and maintenance or security personnel can be dispatched to address the issue and reposition the camera.

In a still further embodiment, one or more cameras 10 located in a position at or about a door 36 or other entrance may be used to track or count the number of people that enter or exit a specific area. Software algorithmic analysis of the images captured by the cameras by the centralized computer can be used to identify, track, and/or count people as they enter or exit a room or area. As a part of these processes, some may require the angular attitude of the camera in order to properly identify people in the captured video image and to determine the direction of movement of the people in the video images. If a camera's angular attitude changes for any reason, this information may not accurately reflect the angle at which the video images are captured which could introduce error into the counting or tracking functions. Therefore, by periodically sampling the actual angular attitude of the camera as determined by the accelerometer, the actual angle of the camera can be used for more accurate determinations using such software programs.

Figure 3:
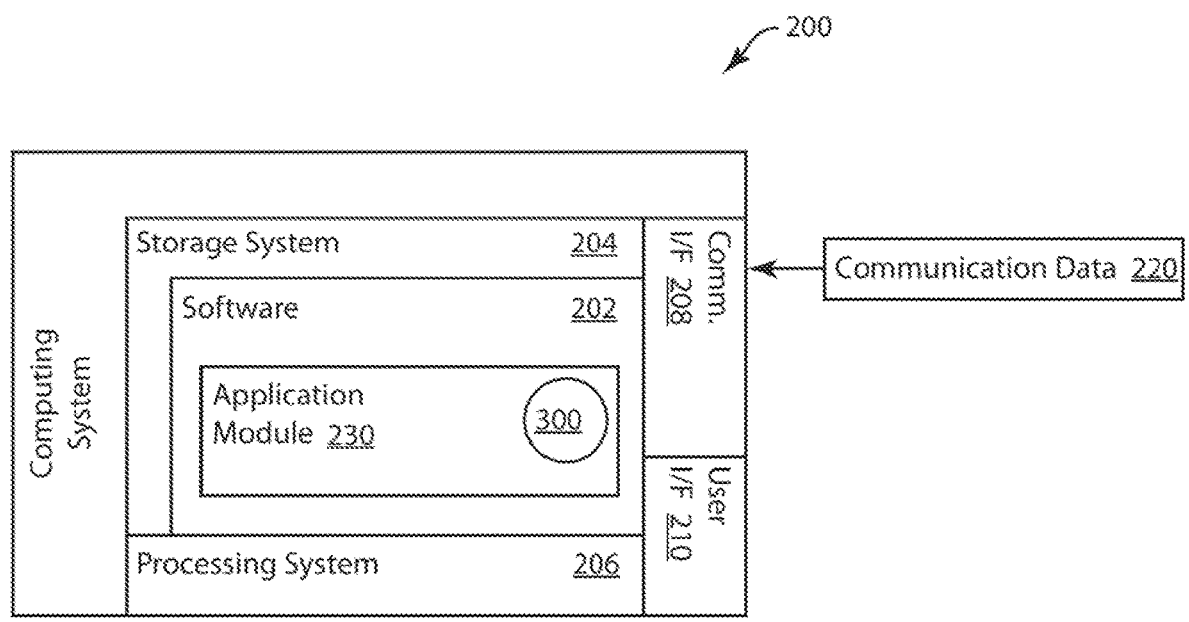
FIG. 3 is a system diagram of an exemplary embodiment of a computing system.

FIG. 3 is a system diagram of an exemplary embodiment of a computing system 200 as may be used in embodiments to implement the processor 18 of the IP camera 10 or the centralized computer 32. The computing system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein. It will be recognized that implementations of the computer system 200 for use as the processor in the IP camera may vary greatly from an implementation used as the centralized computer. Such an implementation as the processor in the IP camera may be a specific use computer or integrated circuit with all of the components of the computing system 200. An implementation of the computing system 200 as the centralized computer 32 may be a general purpose computer that executes a plurality of software modules, in some embodiments simultaneously, exemplarily to carry out video analysis, people counting, HVAC or other environmental control system control, and analysis of other received auxiliary data from the IP cameras.

Although the computing system 200 as depicted in FIG. 3 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can include a microprocessor and other circuitry that retrieves and executes software 202 from storage system 204. Processing system 206 can be implemented within a single processing device but can also be distributed across multiple processing devices or subsystems that cooperate in executing program instructions. Examples of processing system 206 include general purpose central processing units, application specific processors, and logic devices, as well as any other type of processing devices, combinations of processing devices, or variations thereof.

The storage system 204 can include any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable of communicating with the processing system 206.

Examples of storage media include random access memory, read only memory, magnetic discs, optical discs, flash memory, virtual and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. In embodiments, the user interface 210 operates to present and/or to receive information to/from a user of the computing system. Output devices such as a video display or graphical display can display an interface further associated with embodiments of the system and method as disclosed herein. Speakers, printers, haptic devices and other types of output devices may also be included in the user interface 210. It is understood that embodiments of the computing system implementing portions of the IP camera may not include a dedicated user interface and rather user input controls may be received through the communication interface 208, and exemplarily entered by a user at the centralized computer 32 described above.

As described in further detail herein, the computing system 200 receives and transmits data through the communication interface 208. In embodiments, the communication interface 208 operates to send and/or receive data to/from other devices to which the computing system 200 is communicatively connected. In an embodiment of the computing system 200 implementing the centralized computer, original video data may be received from the IP cameras. The original video data is exemplarily stored at a computer readable medium which may be remotely located from the computing system. Additionally, the computing system 200 may receive the auxiliary data from the plurality of IP cameras and the auxiliary data is also stored at a computer readable medium. The computing system 200 executes the at least one application module 230 to carry out the security, safety, environmental monitoring or environmental control functions as disclosed herein. From this processing of the video and/or auxiliary data the computing system 200 can operate an environmental control or HVAC system or provide notices, alerts, or visual data presentations on a graphical display of the user interface 210 to report the MEMS data or identified abnormalities, unexpected occurrences, or alarm conditions determined by the computing system in the M EMS data.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for sensing and video capture, the method comprising:
    capturing, by an optical sensor of a camera at a facility, video image data at a first sampling rate;
    capturing, by an auxiliary sensor of the camera at the facility, auxiliary data at a second sampling rate, wherein the second sampling rate is determined by the first sampling rate;
    transmitting at the first sampling rate, by the camera over a data connection to a centralized computer, the video image data, the centralized computer located at a separate location from the camera;
    transmitting at the second sampling rate, by the camera over the data connection to the centralized computer, the auxiliary data; and
    processing, by the centralized computer, the transmitted video image data and the auxiliary data.

2. The method of claim 1, further comprising providing a close circuit television system for sensing and video capture for the facility.

3. The method of claim 2, wherein the closed circuit television system includes the camera at the facility, the data connection, and the centralized computer.

4. The method of claim 3, wherein the camera includes the optical sensor, the auxiliary sensor, and a processor.

5. The method of claim 1, wherein the video image data is captured more frequently than the auxiliary data.

6. The method of claim 1, wherein the first sampling rate is specified by a user.

7. The method of claim 1, wherein the auxiliary sensor is selected from the group consisting of: a temperature sensor, a magnetic field sensor, a light sensor, a chemical sensor, an accelerometer, a humidity sensor, and a pressure sensor.

8. The method of claim 7, wherein the second sampling rate is also determined based on a type of auxiliary sensor.

9. The method of claim 1, wherein the auxiliary data is non-image data.

10. The method of claim 1, wherein the auxiliary sensor is an accelerometer and the auxiliary data is an orientation of the camera, further wherein the centralized computer processes the transmitted video image data to identify people in the transmitted video image data and count the identified people in the transmitted video image data, wherein the centralized computer uses the orientation of the camera to refine identification of people in the transmitted video image data.

11. A system for sensing and video capture, the system comprising:
    a data connection;
    a centralized computer with a processor, located at a separate location from a camera; and
    the camera for capturing data at a facility, wherein the camera:
        captures, through an optical sensor of the camera, video image data at a first sampling rate;
        captures, through an auxiliary sensor of the camera, auxiliary data at a second sampling rate, wherein the second sampling rate is determined by the first sampling rate;
        transmits the video image data, at the first sampling rate, by the camera over the data connection to the centralized computer;
        transmits the auxiliary data, at the second sampling rate, by the camera; and
    wherein the centralized computer processes the transmitted video image data and the auxiliary data.

12. The system of claim 11, wherein the system further comprises a close circuit television system for sensing and video capture for the facility.

13. The system of claim 12, wherein the closed circuit television system includes the camera at the facility, the data connection, and the centralized computer.

14. The system of claim 13, wherein the camera includes the optical sensor, the auxiliary sensor, and a processor.

15. The system of claim 11, wherein the video image data is captured more frequently than the auxiliary data.

16. The system of claim 11, wherein the first sampling rate is specified by a user.

17. The system of claim 11, wherein the auxiliary sensor is selected from the group consisting of: a temperature sensor, a magnetic field sensor, a light sensor, a chemical sensor, an accelerometer, a humidity sensor, and a pressure sensor.

18. The system of claim 17, wherein the second sampling rate is also determined based on a type of auxiliary sensor.

19. The system of claim 11, wherein the auxiliary data is non-image data.

20. The system of claim 11, wherein the auxiliary sensor is an accelerometer and the auxiliary data is an orientation of the camera, further wherein the centralized computer processes the transmitted video image data to identify people in the transmitted video image data and count the identified people in the transmitted video image data, wherein the centralized computer uses the orientation of the camera to refine identification of people in the transmitted video image data.

\* \* \* \* \*